United States Patent [19]

Wischermann

[11] Patent Number: 5,003,392
[45] Date of Patent: Mar. 26, 1991

[54] CIRCUIT FOR DIGITALLY DERIVING PULES OF HORIZONTAL AND VERTICAL FREQUENCY FROM A SYNCHRONIZING SIGNAL

[75] Inventor: Gerhard Wischermann, Weiterstadt, Fed. Rep. of Germany

[73] Assignee: BTS Broadcast Television Systems GmbH, Darmstadt, Fed. Rep. of Germany

[21] Appl. No.: 410,124

[22] Filed: Sep. 20, 1989

[30] Foreign Application Priority Data

Sep. 23, 1988 [DE] Fed. Rep. of Germany ....... 3832330

[51] Int. Cl.⁵ .......................... H04N 5/08; H04N 5/10
[52] U.S. Cl. ..................................... 358/153; 358/148
[58] Field of Search ...:............ 358/148, 150, 152, 183, 358/154

[56] References Cited

U.S. PATENT DOCUMENTS 4,459,612  7/1984  Shinkai et al. ..................... 358/154
4,631,587  12/1986  Turner ................................ 358/154
4,701,796  10/1987  Kamiy ................................ 358/154

FOREIGN PATENT DOCUMENTS 0016682  1/1987  Japan .

OTHER PUBLICATIONS

ABEL design language; "Language Elements"; pp. 7-1 to 7-22.

CMOS Programmable Array Logic Data Sheet PALC22V10H-25 PALC22V10H-35.

Primary Examiner—John W. Shepperd
Assistant Examiner—Michael D. Parker
Attorney, Agent, or Firm—Frishauf, Holtz, Goodman & Woodward

[57] ABSTRACT

A video synchronizing signal having components of horizontal and vertical scan frequencies is supplied to both of first and second clocked circuit units. The first clocked circuit unit is clocked by a clock signal of a frequency substantially higher than the horizontal frequency component of the synchronizing signal and produces both horizontal frequency pulses and pulses having twice the horizontal frequency by means of a logic circuit which includes a counter. The latter pulses are used to clock the second clocked circuit unit which is supplied with pulses of horizontal frequency as well as with the synchronizing signal. By means of its logic circuits also including a counter, the second circuit unit produces pulses of vertical frequency, frame pulses of half the vertical frequency and a signal indicating whether the input synchronizing signal for both circuits conforms with a 625-line television standard or a 525-line standard. Both the first and second circuit units can be implemented by available programmable array logic (PAL) integrated components and since the processing of the input signals is all digital, there are no circuit time constants which need to be trimmed or calibrated.

13 Claims, 8 Drawing Sheets

```
sm4 DEVICE 'p22v10';   flag '-r3';

clk                         pin 1;                              connections
s1,s2,c2,h,1,y              pin 2,3,14,15,22,23;
q0,q1,q2,q3,q4,q5           pin 21,20,19,18,17,16;

1e   =  q0 & q1 & q2 & q3 & q4 & q5;                            definitions
ce   =  !1e;

y    =  !1 & y # !1 & s1 & !s2;                                 equations
1    :  y;
q0:  =  !(1 & 1e) & (q0 $ ce);
q1:  =  !(1 & 1e) & (q1 $ ce & q0);
q2:  =  !(1 & 1e) & (q2 $ ce & q0 & q1);
q3:  =  !(1 & 1e) & (q3 $ ce & q0 & q1 & q2);
q4:  =  !(1 & 1e) & (q2 $ ce & q0 & q1 & q2 & q3);
q5:  =  !(1 & 1e) & (q2 $ ce & q0 & q1 & q2 & q3 & q4);
h    =  y # 1 # !q5 # !q4 # !q3 # !q2;
!c2: =  q5 & q4 & q3 & q2 & q1 & !q0 # !q4 # !q5 & !q4
                 & q3 & !q2 & !q1 &   q0
```

FIG. 13

```
sm5 DEVICE 'p22v10';   flag '-r3';

connections
c2                      pin 1;
h,s1                    pin 2,3;
v0,v1,v2,f,s            pin 23,22,21,20,19;

definitions
v  = v2 # v1 # v0;
v5 = v2 & !v1 & v0;

equations
v2 := v2 & !v1 &  s1 # !v2 &  v1 & v0 & s1;
v1 := !v2 &  v1 & !v0 &  s1 # !v1 & v0 & s1;
v0 := v2 & !v1 & !v0 &  s1 # !v2 & !v0 & s1;
f  := f & !s1 # f & v # s1 & h & !v;
s  := s & !v5 # s1 & v5;
```

CIRCUIT FOR DIGITALLY DERIVING PULSES OF HORIZONTAL AND VERTICAL FREQUENCY FROM A SYNCHRONIZING SIGNAL

This invention relates to the derivation of pulses of horizontal and vertical scan frequency for a processed television signal from a synchronizating signal obtained, for example, from a television signal to be processed.

In installations and equipment of video technology it is often necessary to derive pulses of horizontal and vertical scan frequencies from a synchronizing signal that contains components of horizontal and vertical scan frequencies. In known circuits and systems for such purposes various circuit units having a characteristic time constant, for example monostable multi-vibrators are used as scanning devices for operating intervals of components. These require calibration, however, with reference to the unavoidable scatter of the characteristics of the time constants manufactured electrical networks may require variations and design for different television systems, for example those operating on a 625-line standard and those operating on a 525 picture line standard.

The terms "horizontal frequency" and "vertical frequency" are used herein in many places to signify respectively horizontal scan frequency and vertical scan frequency, for reasons of brevity.

SUMMARY OF THE INVENTION

It is an object of the present invention to provide a circuit for deriving pulses of horizontal and vertical scan frequencies from a synchronizing signal which can be constituted without time constant determining electrical networks and at low cost.

Briefly the synchronizing signal is supplied to a first clocked circuit unit which is clocked at a frequency much higher than the horizontal frequency component of the synchronizing signal (but much lower than a digital TV sampling rate) to produce horizontal frequency pulses and also pulses having twice the horizontal frequency, and then the pulses of twice the horizontal frequency are used to clock a second clocked circuit unit to which the synchronizing signal and the horizontal frequency pulses are supplied for generating pulses of vertical frequency. The second circuit unit may also advantageously produce pulses of half the vertical frequency (frame pulses). The second circuit unit may also readily generate a signal which is of one binary logic state when a 625-line synchronizing signal is used and of a second logic state when a 525-line synchronizing signal is used.

The advantage of the invention is that it can operate entirely on a digital basis without the use of timing by means of a network containing components such as resistors, capacitors and inductors. Instead, digital components such as counters and other logic circuits can be used. In consequence, no components need to be used that would from time to time need to be calibrated. Furthermore, the circuit of the invention is suitable, in a single design, for signals of either the 525-line standard or the 625-line standard. In that case generation of a signal designating which of the two standards the incoming synchronizing signals obey is likely to be of use for controlling following circuits.

The circuit apparatus of the invention can be implemented simply and economically with two programmable array logic (PAL) components which are available on the market.

BRIEF DESCRIPTION OF THE DRAWINGS

Further details of the circuit apparatus of the invention are best described with help of illustration and by way of example, with reference to the annexed drawings, in which.

The same components are shown with the same reference numerals when they appear in different figures. In the timing diagrams the so-called high signal level for binary signals is always shown above the so-called low level.

DESCRIPTION OF THE ILLUSTRATED EMBODIMENTS

Figures 1, 2:
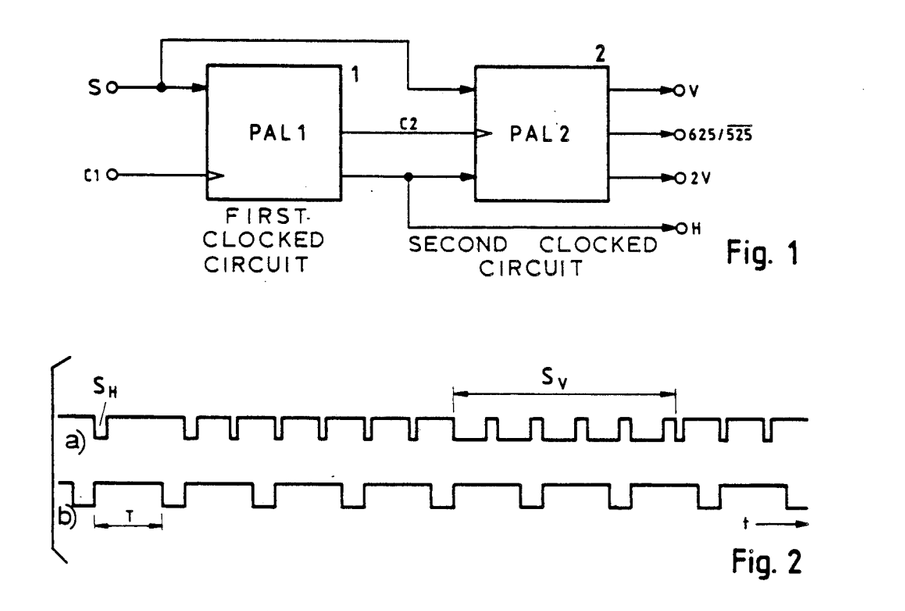
FIG. 1 is a basic circuit block diagram of the circuit apparatus of the invention.
FIG. 2 is a timing diagram showing on the same time scale the synchronizing signal and a horizontal frequency signal in the time region of the vertical blanking interval of the synchronizing signal.

FIG. 1 shows a basic circuit block diagram of an illustrative embodiment of the invention composed of two programmable array logic (PAL) components 1 and 2 which are eached programmed to operate as a clocked circuit unit. The first PAL unit 1 is clocked with a clock signal C1, the frequency of which is substantially higher than that of those synchronization signal S components which are of horizontal frequency. The synchronizing signal S is supplied both to the first PAL unit 1 and to the second PAL unit 2. The first PAL unit 1 generates the pulses H of horizontal frequency and also a signal C2. with which the second PAL unit 2 is clocked. At the outputs of the second PAL unit 2 there are made available pulses V of vertical scan frequency, frame pulses 2V and a signal designating the number of lines of the television standard in use.

In both of the now widely used television standards a full picture or frame is made up of two interlaced fields so that there are two vertical scans per frame.

The upper line (a) of FIG. 2 shows a standard synchronizing signal S in the region of the vertical scan frequency blanking interval. The synchronizing signal contains, in addition to a horizontal frequency component $S_H$, a vertical frequency component $S_V$ which is interrupted by interrupting pulses in such a way that also in portions of the vertical frequency component negative flanks appear with a spacing of a line period. Furthermore, equalizing pulses are found in the region of the vertical frequency blanking interval which are disposed in the middle between two horizontal frequency pulses.

Figure 3:
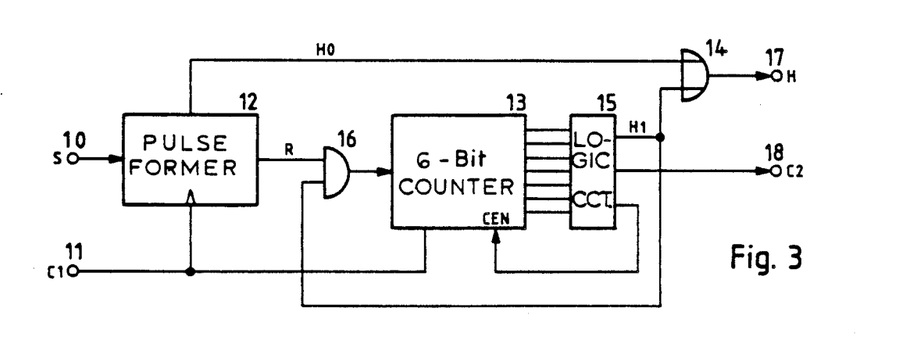
FIG. 3 is a circuit block diagram of explaining the content of the first clocked circuit unit 1 shown in FIG. 1.
Figure 4:
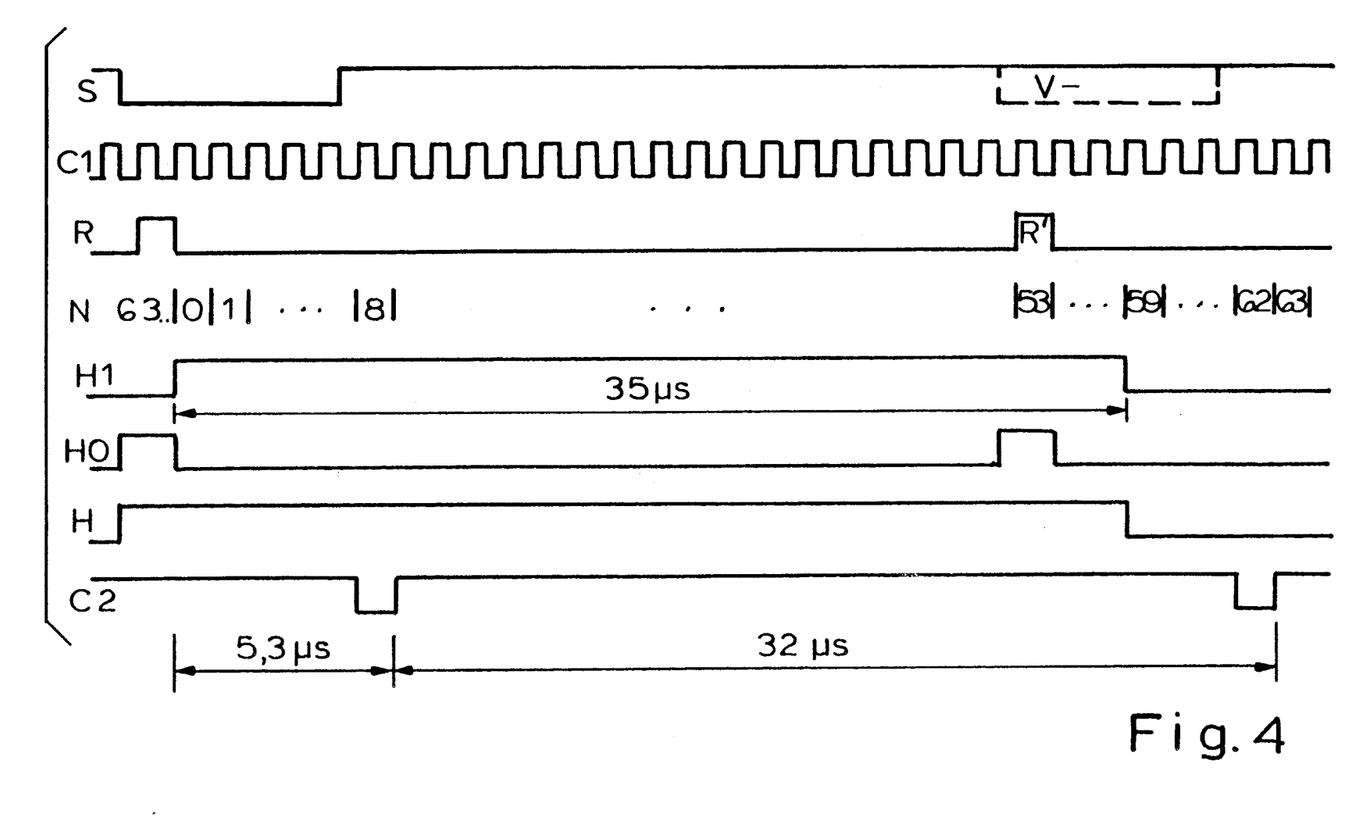
FIG. 4 is a timing diagram to the same time scale of signals appearing in the circuit of FIG. 3.

The lower line (b) of FIG. 1 shows, as an example, horizontal frequency pulses of which the leading flanks (forward or rising flanks) coincide with leading or trailing flanks of the horizontal frequency component $S_H$ of the synchronizing signal. The pulses shown in line (b), as shown, have a substantially greater pulse width T than the normal television studio standard horizontal pulses, but for simplicity they are referred to nevertheless as horizontal or H pulses. The derivation of the H pulses will now be described with reference to FIGS. 3 and 4. FIG. 3 shows a circuit in the form of a circuit block diagram which, on the one hand, can be implemented by discrete components performing the functions and characteristics set forth by means of the timing diagram of FIG. 4 and, on the other hand, can be implemented with great advantage by a corresponding programming of a programmable array logic (PAL) component.

The clock signal C1 is supplied to an input 11 of the circuit of FIG. 3. The frequency of the clock signal C1 is substantially greater than the horizontal frequency. Coupling of the clock signal C1 to the horizontal frequency in any way is, as such, not necessary for the function of the circuit apparatus of the invention. For reasons of simplicity, however, the clock signal C1 in digital systems would be derived from an already available rhythm, for example the sampling rate rhythm. In systems with a sampling frequency of 13.5 MHz the frequency of 1.6875 MHz can be obtained for the clock signal C1 advantageously by frequency division by 8. This frequency provides a basis for the further explanation of this particular illustrative example. A 6-bit counter 13 and a pulse former 12 are clocked by the clock signal C1.

More generally, the frequency of the clock signal C1 and the count maximum at which the counter 13 overflows are preferably selected so that the count maximum is less than the ratio of the C1 frequency to the horizontal scan frequency H and greater than half that ratio.

Figure 11:
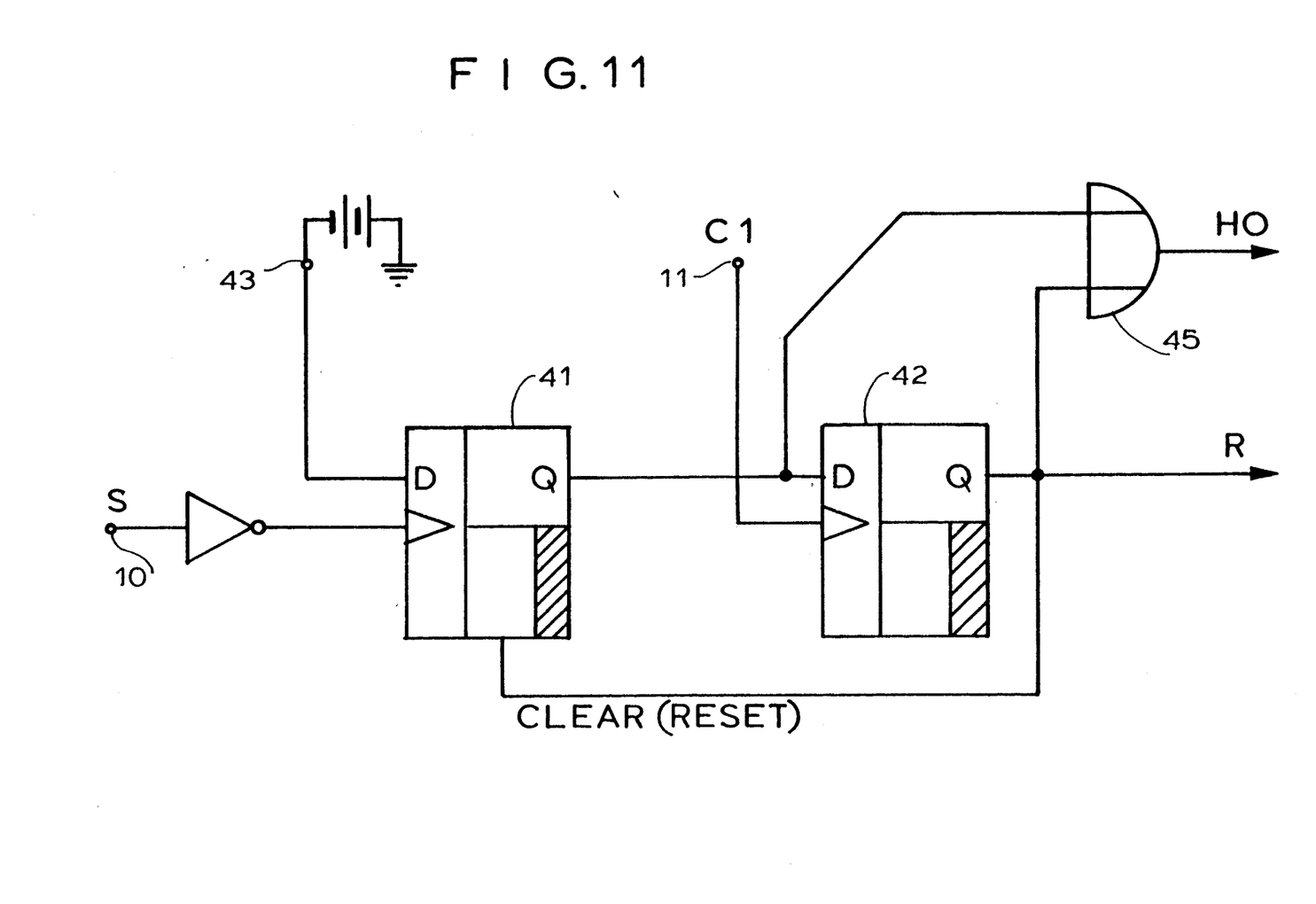
FIG. 11 is a block circuit diagram of the pulse former 12 of FIG. 3.

The synchronizing signal S is supplied to the pulse former 12 through an input 10, while the clock signal C1 is supplied from the input 11. A reset pulse R and a pulse H0 are generated by every trailing flank of the synchronizing signal S. This can take place, for example, with two interconnected D flipflops, as shown in FIG. 11 which illustrates a suitable circuit for the pulse former 12. The flipflop 41 is clocked with the synchronizing signal S and the flipflop 42 with the clock signal C1. The flipflop 41 will be set by the negative (trailing) flank of the synchronizing signal because of the high logic level voltage applied through the terminal 43 to its D input. The next succeeding positive (leading) flank of the clock signal C1 will transfer the content of the flipflop 41 into the flipflop 42 while the flipflop 41 will be reset by the Q output of the flipflop 42, so that with the following flank of the clock signal C1 the flipflop 42 will also be reset, since the flipflop 42 takes over the corresponding logic level from the flipflop 41. From this operation the Q output of flipflop 42 produces the reset pulse R for the counter 13. The pulses H0 are a correlation by the OR gate 45 of the respective output signals of both flipflops 41 and 42. As these pulses HO appear at the output of the OR gate 45, their leading flanks coincide with the negative or trailing flanks of the synchronizing signal S independently of the phase difference between the synchronizing signal S and the clock signal C1.

The pulses R and H0 also appear in the equalizing pulses above-mentioned. In order to remove the supplementary pulses, the pulses H0 run through an OR gate 14 (FIG. 3), of which the other input is supplied with a signal H1. In addition to the counter 13 a logic circuit 15 is used for deriving the signals H1. The counter 13 is reset to 0 by the trailing flanks of the pulses R. The counter 13 then counts upward with the signal C2 until the counter state 63 is reached. At that time a signal is provided from the logic circuit 15 to a count enable input (CEN) of the counter 13 which prevents further counting. Only after being reset by the next pulse R does the counter again count upwards. At a counter state which is not reached until the end of a pulse R' (FIG. 4) initiated by an equalizing pulse, the logic circuit 15 provides a signal which, acting through an AND gate 16, frees the reset input of the counter 13 which was previously blocked. The same H1 signal provided by the logic circuit 15 is supplied to the second input of the OR gate 14 and thus, together with the signal H0, forms the signal H that is made available at the output 17.

The logic circuit 15 further supplies, at the counter states 8 and 62, the signal C2 which has twice the horizontal frequency. This signal C2 is shown in FIG. 3 to be available at the output 18 for use in clocking the second circuit unit 2 of FIG. 1 (See FIG. 7).

Figure 5:
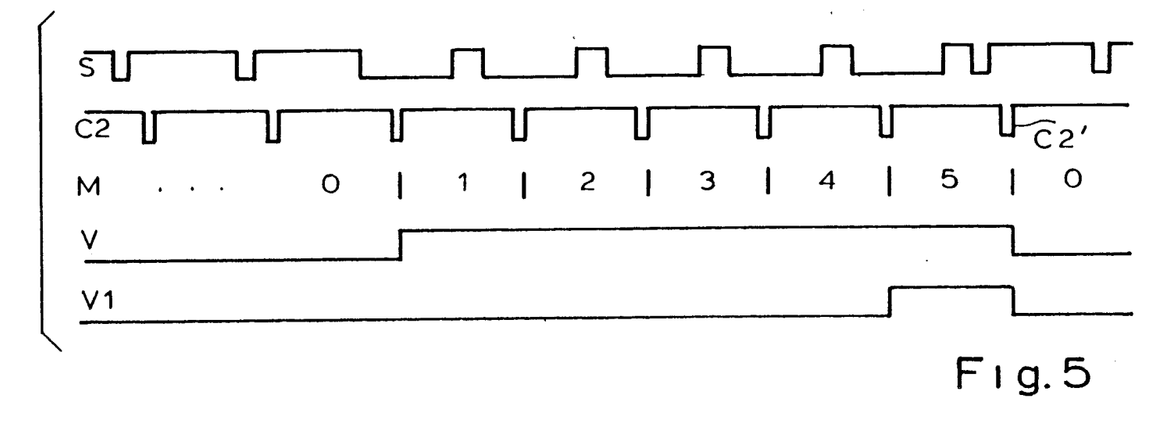
FIG. 5 is a timing diagram to the same time scale of various signals in the region of the vertical frequency blanking interval, for explaining the derivation of vertical pulses for the 625-line standard.
Figure 6:
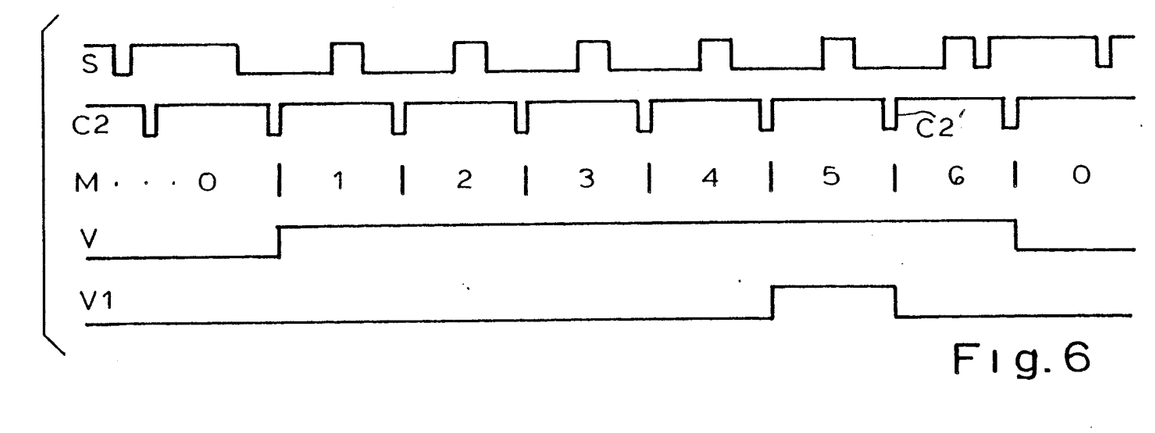
FIG. 6 is a timing diagram like that of FIG. 5 but relating to corresponding signals for the 525-line standard.
Figure 7:
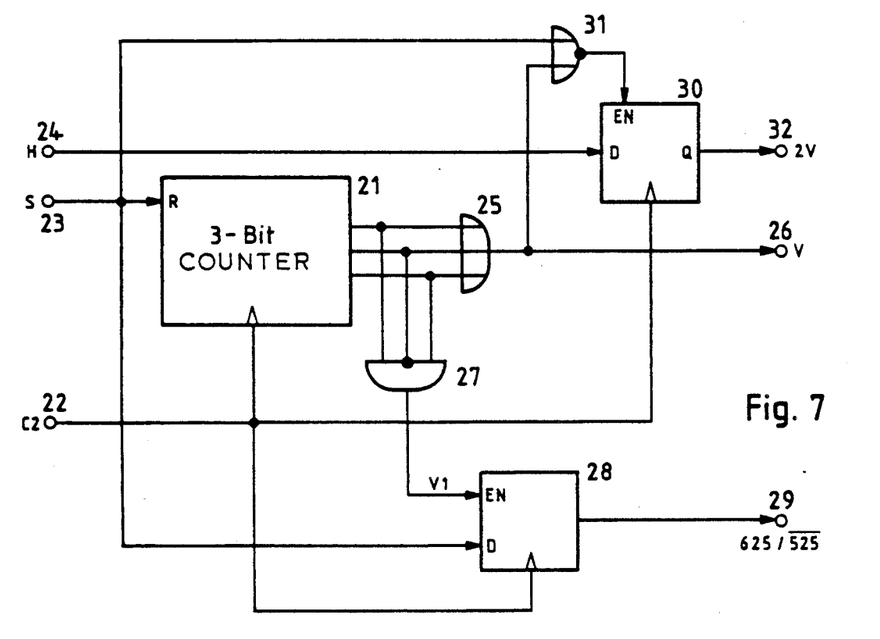
FIG. 7 is a circuit block diagram for explaining the contents of the second clocked circuit unit 2 of FIG. 1.

The second clocked circuit unit can likewise be advantageously implemented with a PAL component. For reasons of more intelligible concise presentation, however, this unit is also explained by reference to circuit block diagrams and timing diagrams. This explanation first requires consideration of FIGS. 5, 6 and 7 showing the derivation of the vertical frequency pulses. FIGS. 5 and 6 show the synchronizing signal S, the signal C2, the counter state M, a vertical frequency pulse V and a further vertical frequency pulse V1 in the region of the vertical frequency blanking interval, both for the 625-line standard and for the 525-line standard. The counter state M is the temporary content of a 3-bit counter 21 (FIG. 7).

The signal C2 is phase-shifted with the respect to the pulses of the horizontal frequency component of the synchronizing signal S as a result of the above-described choice of the counter states of the counter 13 (FIG. 3) for generating the signal C2.

By the connection 22 the signal C2 is supplied to the counting rhythm input of the counter 21. The synchronizing signal S reaches a reset input R of the counter 21 over the connection 23. Thus the counter is either incremented by 1 or reset to 0, depending upon the contemporary level of the synchronizing signal S at the time of a pulse of the signal C2. As can be seen from FIGS. 5 and 6, this leads to the result that the counter counts to 5 under the 625-line standard and counts to 6 under the 525-line standard before it is reset. A logic circuit 25 is connected to follow the outputs of the counter 21 and has the function of providing a high (H) level output at the output 26 at all counter states other than 0 and a low (L) level at the counter state 0. As a result, under the 625-line standard a 2½ line wide V pulse is produced, while the V pulse for the 525-line standard is three lines wide.

The length (pulse width) of the vertical frequency component of the synchronizing signal S, which is dependent upon the television standard, is evaluated for recognizing which standard is being used. By means of a further logic circuit 27 the output signals of the counter 21 are so correlated that the output signal V1 of the logic circuit 27 takes the H level when the counter state M=5. The counter state advance in response to the trailing edge of a C2 pulse, so that during the C2 pulse the counter remains in its previous state, as does also the signal V1, the H level of which coincides with the counter state M=5. The signal V1 is supplied to the enable input of a D-flipflop 28, of which the data input D is supplied with the synchronizing signal S and the clock input of which is supplied with the clock signal C2. By control of the data transfer by means of the signal V1 the value of the synchronizing signal S is taken over into the flipflop 28 only by the pulse C2' which is produced at a counter state M=5. At the output Q of the flipflop 28 and thereby at the output 29 of the circuit shown in FIG. 7 a signal is thus provided that has the level H during use of the 625-line standard and the level L during the use of the 525-line standard.

Figure 9:
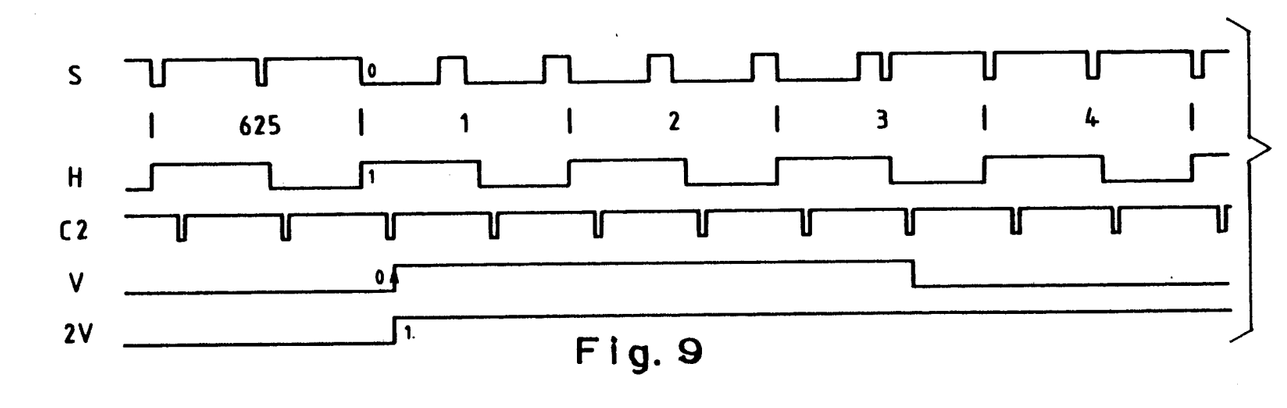
FIG. 9 is a timing diagram to the same scale of signals in the region of the vertical frequency blanking interval preceding the first field of a frame.
Figure 10:
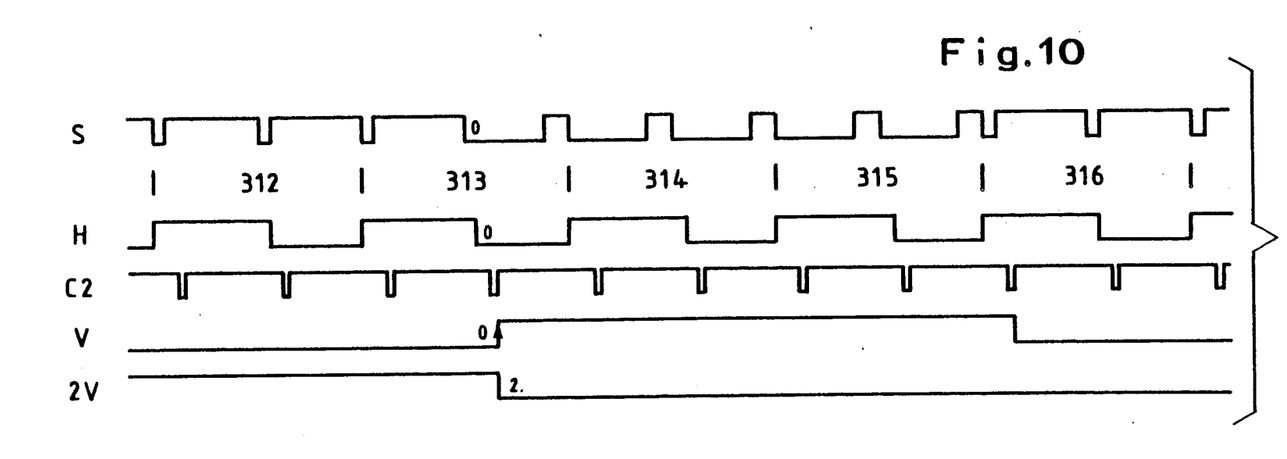
FIG. 10 is a timing diagram to the same time scale of signals corresponding to those of FIG. 9 which appear in the region of the vertical frequency blanking interval preceding the second field of a frame.

Because of the uneven number of lines per frame, each picture field contains a half line. The first picture field begins at the beginning of the line, whereas the beginning of the second picture field occurs in the middle of a line. This distinguishing fact is used for 2V recognition. In FIGS. 9 and 10 timing diagrams respectively for the beginning of the first and second picture fields are shown for the synchronizing signal S, the horizontal frequency pulses H, the signal C2, a vertical frequency pulse V and the signal 2V. In addition the FIGS. 9 and 10 show the prime interval relating to every line with the corresponding line number.

It can be seen from FIGS. 9 and 10 that at a positive flank of the signal C2 after which the V pulse of the first picture field follows, the levels S=0, H=1 and V=0 are present. At the positive flank of C2 after which the V pulse of the second picture field follows, however, H=0 while S=0 and V=0. For deriving the signal 2V, therefore, an additional flipflop 30 is provided (FIG. 7) the state of which depends on the level of the H pulses at the instants clocked at the rhythm of C2. The desired instants occur only when S and V are both 0. Accordingly the synchronizing signal S and the vertical frequency pulses are supplied to a NOR gate 31 to an enable input EN of the flipflop 30. At the output 32 the signal 2V is therefore made available.

Figure 8:
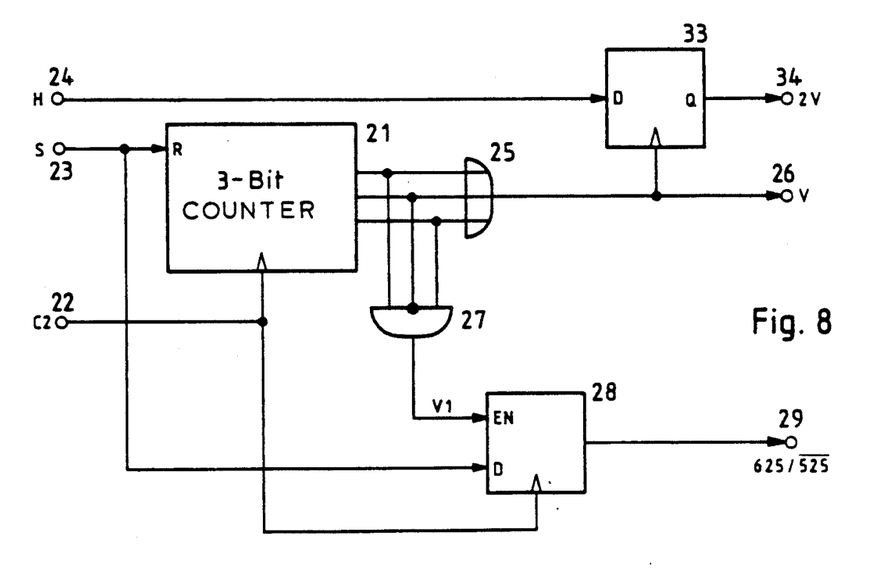
FIG. 8 is a circuit diagram of a second embodiment of the contents of the second clocked circuit unit 2 of FIG. 1.

In the circuit configuration according to FIG. 8 which in other respects corresponds to the configuration of FIG. 7 advantages taken of the fact that the signal H has the level H deposited flank of the pulse V at the beginning of the first picture field and has the level L at the beginning of the second picture field. The signal 2V can then be derived in a simple way by providing the signal H to the data input of another D flipflop 33 which is clocked with the vertical frequency pulses. At the output 34 of the additional flipflop 33 the signal 2V represented in FIGS. 9 and 10 is made available.

The configuration according to FIG. 7 has the advantage that the counter 21 and the flipflops 28 and 30 receive the same clock signal. As a result the circuit can be implemented by PAL components obtainable on the market. There have already been PAL components offered on the market, however, in which separate regions can be clocked with different frequencies, so that implementation of the configuration of FIG. 8 is also possible with such a component. It may ultimately be found that also the entire circuit configuration according to the invention can be implemented with a single component of this kind.

Figure 12:
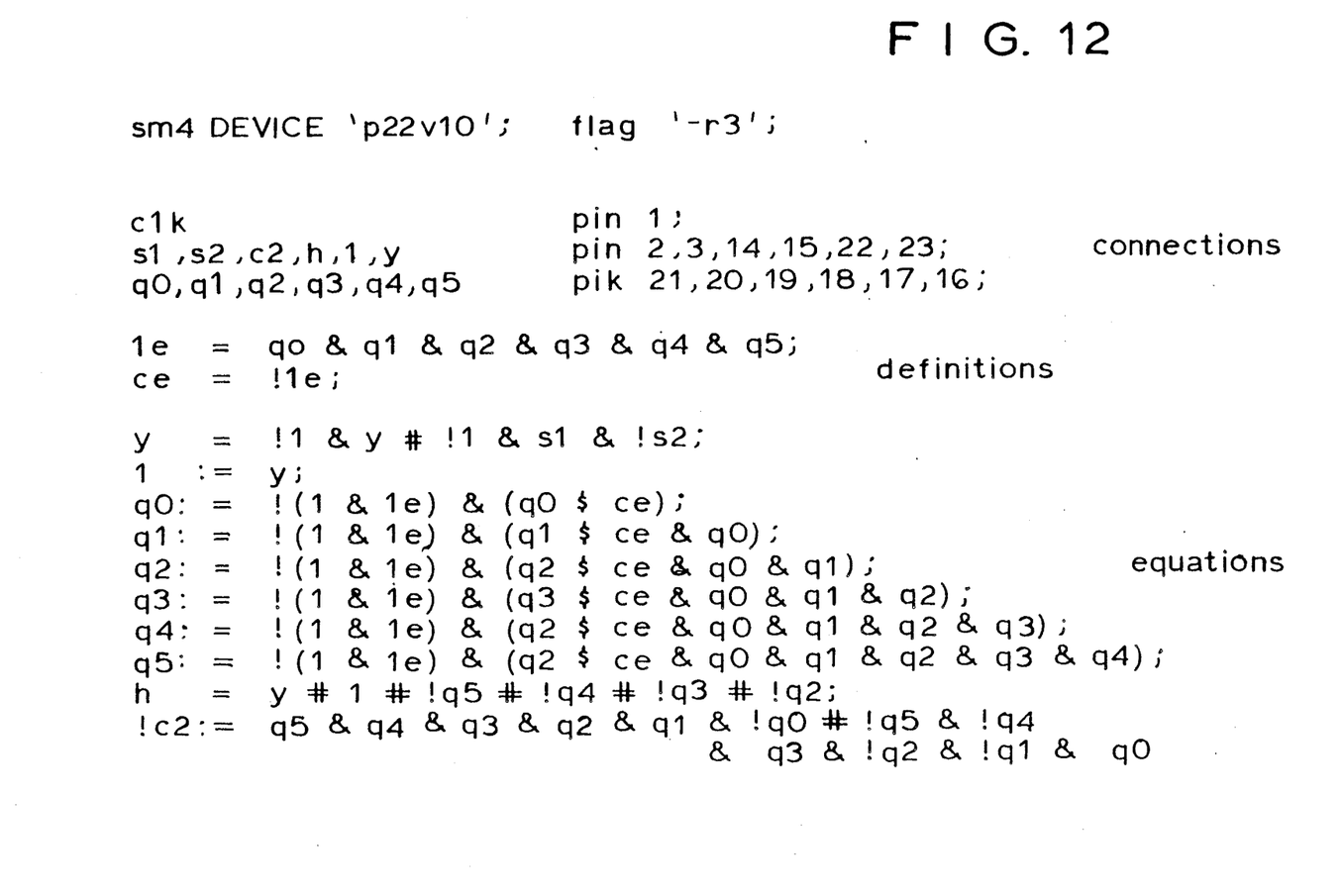
FIG. 12 is a table specifying the programming for the component 1 of FIG. 1.
Figure 13:
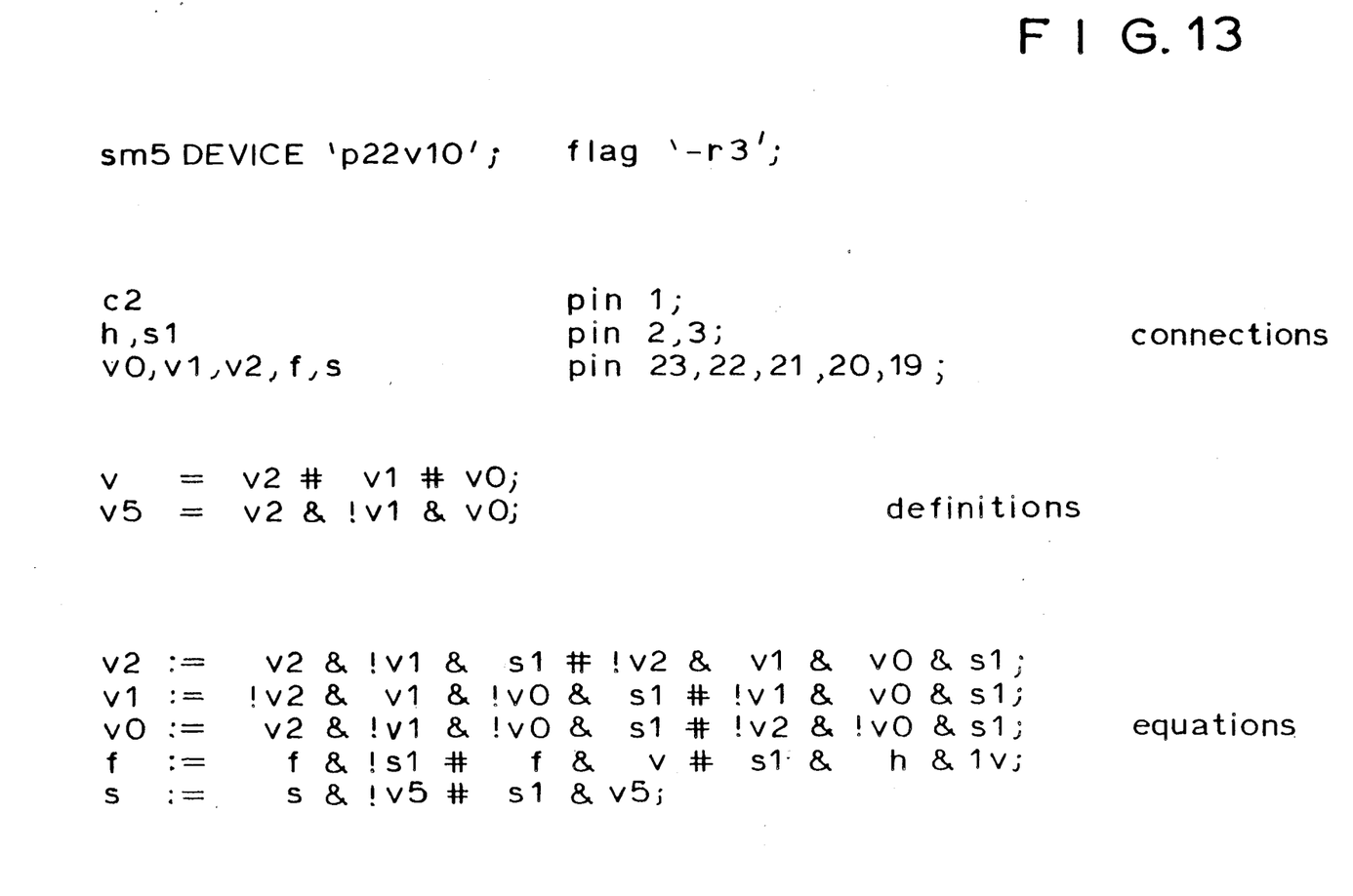
FIG. 13 is a table specifying the programming of the component 2 of FIG. 1.

PAL units available as type p22v10 are suitable both for the circuit 1 and for the circuit 2 of FIG. 1. The programming of a device of type p22v10 is illustrated in FIG. 12 for the circuit 1 of FIG. 1 and in FIG. 13 for the circuit 2 of FIG. 1. The programming equations are expressed in Abel syntax which has been made known by FutureNet. Certain quantities used in the equations are defined likewise in Abel syntax.

These PAL units incorporate pulse counting logic that is programmable, as well as other types of programmable digital logic, so that the object of the invention is accomplished in a strictly digital fashion, whether PAL units are used or whether an implementation corresponding more closely to FIGS. 3 and 7 is used.

Although the invention has been described with reference to particular illustrative examples, it will be recognized that modifications and variations are possible within the inventive concept.

I claim:

1. A circuit apparatus for deriving horizontal frequency and vertical frequency pulses for video signal processing from a video synchronizing signal (S) having respective horizontal and vertical frequency components, by digital electronic means, said apparatus comprising:

a source of pulses of a first clock signal (C1) of a frequency substantially higher than said horizontal frequency component of said synchronizing signal (S);

a first clocked circuit unit incorporating a pulse counting logic portion in said circuit unit and having first and second outputs, a first input to which said synchronizing signal is supplied and a second input for clocking said unit connected to said source of pulses of said clock signal (C1), and means, including said pulse counting logic portion, for deriving, from said input signals, pulses of a horizontal frequency signal (H) provided at said first output and pulses of a second clock signal (C2) provided at said second output and having twice the frequency of said horizontal frequency signal (H), and a second clocked circuit unit incorporating a pulse counting logic portion in said second circuit unit and having an output, a first input to which said synchronizing signal (S) is supplied, a second input to which said pulses of horizontal frequency signal (H) are supplied, a third input at which said pulses of said second clock signal (C2) are supplied for clocking said second circuit unit and means, including said pulse counting logic portion of said second circuit unit, for deriving, from said signals provided at said inputs of said second circuit unit, pulses of a vertical frequency signal (V) provided at said output of said second circuit unit.

2. The circuit apparatus of claim 1, wherein said second clocked circuit unit has a second output and has means for deriving, from said pulses of said vertical frequency signal (V) and from said pulses of said horizontal frequency signal (H), pulses of a frame signal (2V) having half the frequency of said pulses of said vertical frequency signal.

3. The circuit apparatus of claim 1, wherein said clocked circuit unit also includes means for deriving from said synchronizing signal (S), from said second clock signal (C2) and from said pulse counting logic portion of said second circuit unit a binary value signal having a first state designating the presence of a 625-line synchronizing signal and a second state designating the presence of a 525-line synchronizing signal.

4. The circuit apparatus of claim 2, wherein said clocked circuit unit also includes means for deriving from said synchronizing signal (S), from said second clock signal (C2) and from said pulse counting logic portion of said second circuit unit a binary value signal having a first state designating the presence of a 625-line synchronizing signal and a second state designating the presence of a 525-line synchronizing signal.

5. The circuit apparatus of claim 1, wherein said first clocked circuit unit comprises a pulse former circuit (12) and a counter (13), said counter having outputs, a counting clock input to which said first clock signal (C1) is supplied and a reset input, said pulse former (12) having means for control thereof by the leading flanks of said synchronizing signal (S) and having an output connected to said reset input of said counter, and also a first logic circuit (15) having first and second outputs and having inputs respectively connected to outputs of said counter (13), said pulse former circuit (12) having also a second output, and a second logic circuit (14) having inputs respectively connected to said first output of said first logic circuit (15) and to said second output of said pulse former (12), said second output of said first logic circuit (15) being an output for pulses of said second clock signal (C2) for said second circuit unit and the output of said second logic circuit (14) providing an output of said pulses of said horizontal frequency signal (H).

6. The circuit apparatus of claim 5, wherein said counter (13) has a maximum count content which is smaller than the ratio of said frequency of said first clock signal (C1) to the frequency of said horizontal frequency signal (H) and greater than half of said ratio.

7. The circuit apparatus of claim 5, wherein said pulse former (12), said counter (13), said first logic circuit (15) and said second logic circuit (14) are combined in a programmable array logic unit.

8. The circuit apparatus of claim 1, wherein said second clocked circuit unit, in said pulse counting logic portion thereof, includes a counter (21) and a first logic circuit (25), said counter (21) having a reset input connected to said first input of said second circuit unit and a counting clock input connected to said third input of said second circuit unit and having count state outputs connected to said first logic circuit (25) and said first logic circuit having an output constituting said output of said second circuit unit.

9. The circuit apparatus of claim 8, wherein said second clocked circuit unit comprises a second logic circuit (27) and a D-flipflop (28) having an enable input, a clock input, a data input and an output, said second logic circuit (27) having inputs respectively connected to outputs of said counter (21) and having an output connected to said enable input of said D-flipflop (28), said clock input of said D-flipflop (28) being connected to said third input of said second circuit unit, said data input of said D-flipflop being connected to said first input of said second circuit unit, said counter outputs connected with said second logic circuit (27) being so selected that said output of said D-flipflop (28) produces a signal for designating whether said synchronizing signal (S) conforms to a 625-line standard or whether it conforms to a 525-line standard.

10. The circuit apparatus of claim 8, wherein a D-flipflop (33) is provided having a clock input, a data input and an output, said clock input being connected to said output of said first logic circuit (25) said data input being connected to said second input of said second circuit unit and said output of said D-flipflop being an additional output of said second circuit unit at which there are made available frame pulses (2V) of a signal having half the frequency of said vertical frequency pulses (V).

11. The circuit apparatus of claim 8, which comprises a D-flipflop (30) having an enable input, a D-input, a clock input and an output and wherein a second logic circuit (31) is provided having first and second inputs and having an output connected to said enable input of said D-flipflop, said first input of said second logic circuit being connected to said first input of said second circuit unit and said second input of said second logic circuit (31) being connected to the output of said first logic circuit (25) and said clock input of said D-flipflop (30) being connected to said third input of said second circuit unit, whereby said output of said D-flipflop provides, at a second output of said second circuit unit, frame pulses of a signal having half the frequency of said vertical frequency signal (V).

12. The circuit apparatus of claim 8, wherein said second clocked circuit unit is in the form of a programmable array logic (PAL) unit.

13. The circuit apparatus of claim 1, wherein both said first clocked circuit unit and said second clocked circuit unit are constituted as a single programmable array logic unit having a plurality of regions respectively connected for being clocked by different clock signals.

* * * * *